(12) United States Patent
Arrieta (10) Patent No.: US 6,669,138 B1
(45) Date of Patent: Dec. 30, 2003

(54) ROTARY AERONAUTICAL LIFTING CELL

(76) Inventor: Francisco A. Arrieta, "D" St. #31, Garcia Development, Rio Piedras, PR (US) 30308-2216

( * ) Notice: Subject to any disclaimer, the term of this patent is extended or adjusted under 35 U.S.C. 154(b) by 0 days.

(21) Appl. No.: 10/041,210

(22) Filed: Jan. 8, 2002

Related U.S. Application Data (60) Provisional application No. 60/260,254, filed on Jan. 8, 2001.

(51) Int. Cl.[7] ............................................... B64C 39/06
(52) U.S. Cl. ....................... 244/12.2; 244/39; 244/34 A
(58) Field of Search ............................. 244/12.2, 23 C, 244/34 A, 39

(56) References Cited

U.S. PATENT DOCUMENTS

| | | | | |
|---|---|---|---|---|
| 1,906,764 A | * | 5/1933 | Petersen | ...................... 244/39 |
| 4,301,981 A | * | 11/1981 | Hartt | .......................... 244/12.2 |
| 5,046,685 A | * | 9/1991 | Bose | ......................... 244/23 C |
| 5,203,521 A | * | 4/1993 | Day | ........................... 244/12.2 |
| 5,503,351 A | * | 4/1996 | Vass | ........................... 244/34 A |

* cited by examiner

*Primary Examiner*—Robert P. Swiatek
(74) *Attorney, Agent, or Firm*—Troutman Sanders LLP; Ryan A. Schneider, Esq.

(57) ABSTRACT

A rotary aeronautical lifting cell having an annular airfoil, airfoil dividers, and a propulsion mechanism. The airfoil dividers separate the annular airfoil into airfoil sections arranged in circular relationship. Upon rotation of the present aeronautical cell, the airfoil sections provide components of lift and propulsion to transportation vehicles attached thereto.

6 Claims, 7 Drawing Sheets

ROTARY AERONAUTICAL LIFTING CELL

RELATED US APPLICATION DATA

This application claims priority from U.S. Provisional Application No. 60/260,254 filed Jan. 8, 2001, incorporated herein by reference.

BACKGROUND OF THE INVENTION

1. Field of the Invention

This invention relates generally to a method of, and apparatus for, propulsion in a fluid, and more particularly for lifting and transporting loads and passengers with the principle of a rotary aeronautical lifting cell having a novel configuration of circular airfoil elements.

2. Description of Related Art

While the present invention relates to a propulsion device that can be used in a number of fluids, particular reference will be made throughout this disclosure to an air-type propulsion device for convenience of description only. When an airplane flies, it must first overcome two primary forces—weight and drag. Weight is the force of gravity acting to pull the plane to the ground, which weight is overcome through lift. Lift enables the plane to rise into the air. Drag is created by the force of air particles striking and flowing around the airplane, and is overcome through thrust. Thrust is the push or pull on the plane that subjects the plane to a forward direction of travel. The thrust of an airplane is typically provided by jet engines or propellers.

The shape of a wing is what makes lift possible for an airplane. A wing incorporates a leading edge and a trailing edge. The leading edge slices through the air, producing two air streams, one over and one under the wing. Due to the curvature in the upper and/or lower surfaces of the wing, the upper air stream must travel faster over the top of the wing than does the lower air stream under the bottom of the wing in order for the two air streams to merge at the trailing edge of the wing at the same time. From Bernoulli's Principle, when the velocity of air is increased, the air pressure in that region is decreased. Therefore, a wing has a lower pressure area directly over its upper curved surface than it does under its lower surface. This difference in pressures causes the higher air pressure underneath each wing to push the wing up into the air. This rising of the wing due to Bernoulli's Principle is known as "induced lift."

Bernoulli's Principle is also at work in a carburetor. Conventional carburetor devices produce a combustible fuel and air mixture by causing air to be drawn through a venturi into which liquid gasoline is fed. As the air passes through the venturi, the velocity of the air increases, which results in a drop in pressure of the air, providing a suction effect to pull in fuel.

Referring generally to an airfoil, an airfoil creates lift because the air stream encountered by the leading edge of the airfoil is split over and under the airfoil. The air adjacent the upper camber of the airfoil travels faster than the air adjacent the lower camber of the airfoil. The resulting pressure difference multiplied by the area of the wing defines the lifting capacities of the wing.

An airfoil shape works to generate lift because of the Coanda effect. At its broadest level, the Coanda phenomenon can be explained as the deflection of jets by solid surfaces. It is well known that flows have a tendency to become attached to or flow around a solid surface. The shape of the upper camber of an airfoil is designed to encourage adhesion of the air flowing over the top of the airfoil. The air flowing over the top of the airfoil adheres to the shape of the upper camber. This eliminates a certain amount of drag, and it also creates more lift. Also, as the air leaves the trailing edge of the top part of the airfoil, it has a downward direction. This provides another source of upward lift.

There are numerous disadvantages associated with conventional wings or helicopter rotors. A wing or rotor in an air mass must be moved forward in reference to the air mass in order to produce lift. Thus, a conventional airplane cannot operate as a helicopter, that is, land or takeoff vertically, due to the necessity of this forward movement. While the helicopter can takeoff and land vertically, the rotational velocity and the diameter of its rotors requires the helicopter to operate in an abundance of unobstructed air space so as to avoid contact with any obstacles.

Further, a helicopter rotor is susceptible to the development of cracks because of material conditions, including its narrow shape and length, and because of its operating conditions, including constant vibration, twisting and bending. A helicopter rotor also is relatively noisy because of the rotational velocity of the outer section of the blades, and the constant vibration encountered by the constantly changing directions of the air.

Thus, it can be seen that there is a need for a method and apparatus that can provide lift with the principle of a rotary aeronautical lifting cell, which cell overcomes the above identified disadvantages inherent in the conventional wing and rotor.

BRIEF SUMMARY OF THE INVENTION

Briefly described, in a preferred form, the present invention presents both a novel method of propulsion, and a propulsion device, utilizing a rotary aeronautical lifting cell. In particular, the present invention relates to an aeronautical cell, or cells in tandem, and their use in flying machines. The aeronautical cell comprises a circular airfoil, a fluid propulsion system, a motive source and optionally a steering assembly.

The circular airfoil is an annular ring of an airfoil. The circular airfoil is defined by a bottom surface, which is preferably but not necessarily flat, an upper camber airfoil surface, and a center fluid intake hole.

The fluid propulsion device can aid in propelling the fluid over the airfoil. The fluid propulsion device can incorporate an airfoil divider extending upward from a portion of the airfoil surface. The airfoil divider also can extend through a portion of the airfoil via grooves in the airfoil. The airfoil divider generally is a wall separating the airfoil into airfoil sections. In this sense, the airfoil dividers are like vanes in a turbocharger.

The fluid propulsion device can alternatively incorporate vanes similar to those used on a "squirrel cage" type of blower wheel. These series of vanes can be located around the perimeter of the center fluid intake hole, or the outer perimeter, or a combination of both.

In another embodiment of the propulsion device, a combination of dividers and squirrel cage vanes can be used to propel the fluid over the airfoil.

The airfoil and dividers and/or vanes of the fluid propulsion device are sandwiched between a top and bottom element, which elements preferably lie in parallel planes. If the airfoil is separated into airfoil sections, the sections are arranged in a circular series, and are fixed atop a preferably rigid bottom element or circular bottom plate member. The airfoil does not extend from the bottom to the top element, so as to allow for airflow over the airfoil and under the top element. On the other hand, the dividers and/or vanes extend preferably normal between the bottom and top elements. Alternatively, either or both of the top and bottom elements can incorporate a dihedral angle to produce a more stable lifting cell. Dihedral is here defined as the upward angle given to all or part of the present cell. Dihedral is often used to provide roll stability, which is simply the tendency for an airfoil to level itself after some disturbance has banked it.

Air is forced to move above the upper camber airfoil surface of the airfoil by the fluid propulsion device and the rotation of the airfoil. In the embodiment incorporating the squirrel cage vanes, the angle of the vanes force the air over the upper camber airfoil surface in the same way a blower works in an air conditioning unit.

The bottom plate member can in turn be connected to a motive source to rotate the cell, for example, an output shaft of a motor confined within a motor housing.

In one embodiment, as each of the airfoil sections is moved through the fluid, for example, air or water, the fluid suctions through the center fluid intake hole, and is directed over the upper airfoil surfaces by the fluid propulsion device. Multiple cells of the present invention can be used in tandem or in series to increase the lifting capacity over just a single unit.

Thus, it is an object of the present invention to provide an improved method for propulsion.

Further, it is thus a general object of the present invention to provide a method of using a rotary airfoil and an apparatus for this novel airfoil.

These and other objects, features, and advantages of the present invention will become more apparent upon reading the following specification in conjunction with the accompanying drawing figures.

BRIEF DESCRIPTION OF THE DRAWINGS

FIG. 7 is a perspective view of an annular airfoil of the present invention with a representative cross-sectional portion removed.

DETAILED DESCRIPTION OF PREFERRED EMBODIMENTS

Referring now in detail to the drawing figures, wherein like reference numerals represent like parts throughout the several views, in preferred embodiments shown in FIGS. 1–17, the present invention 10 comprises a circular airfoil 20, a fluid propulsion device 30, a motive source 70 and a steering assembly 80.

The preferred circular airfoil 20 is illustrated in perspective view in FIG. 7 as an annular airfoil 20. Airfoil 20 somewhat resembles one-half of a bagel or donut, sliced horizontally to provide a bottom surface 22 which is preferably flat, an upper camber airfoil surface 24, and a center hole 26. It will be understood by those skilled in the art that annular airfoil 20 need not have a flat bottom surface 22, but may be defined by a lower camber airfoil surface 22. There is shown removed a portion of airfoil 20 to illustrate a cross-section of airfoil 20.

Presently, it is preferred to use a regular airfoil section similar to a "Y" airfoil 20, but it is contemplated that a more efficient shape for this kind of application exists. The preferred shape of the airfoil 20 depends on the ultimate use of the cell 10 and the type/density of the media where the unit is operated.

Figure 4:
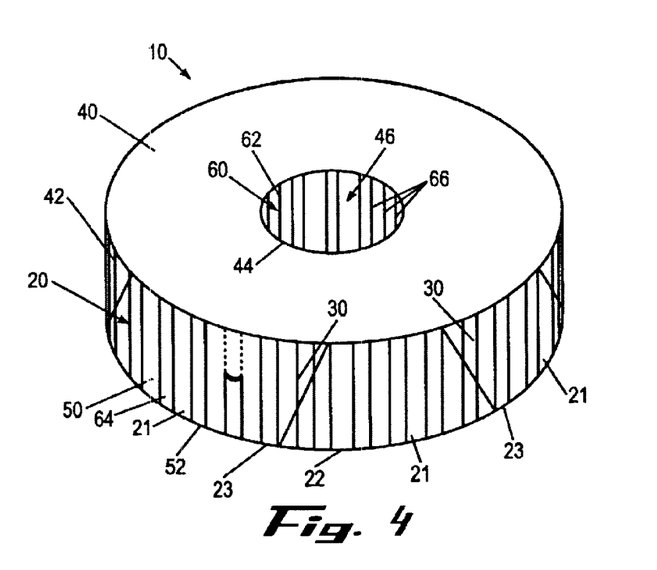
FIG. 4 is a perspective view of the present invention according to another preferred embodiment.
Figure 5:
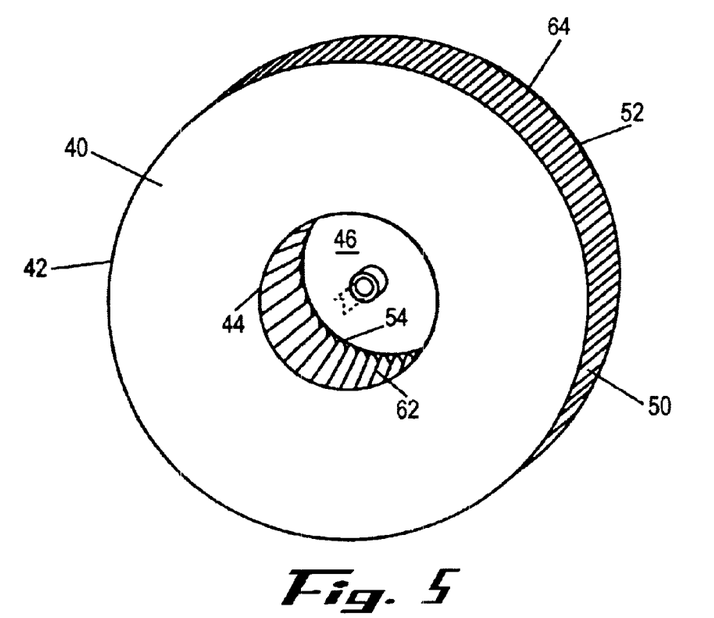
FIG. 5 is a perspective view of the top and bottom elements of the present invention connected to one another by two baffling members.

As shown in FIGS. 4 and 5, the top and bottom elements 40, 50 preferably lie in parallel planes. The top element 40 is bounded by outer and inner circular edges 42, 44, respectively. The bottom element 50 is bounded by an outer circular edge 52, and incorporates an inner ring 54 that preferably aligns with the inner edge 44 of the top element 40 when the top element 40 is configured over bottom element 50. Bottom element 50 is described as having an inner ring 54 because bottom element 50 may be an integral circular element, not an annular element. Alternatively, bottom element 50 may incorporate an aperture, or hole, similar to the hole 46 in top element 40. Top element 40 includes hole 46 bounded by inner edge 44 so, upon rotation of the cell 10, air may be drawn into, or out of, the cell 10 through hole 46. Alternatively, the bottom surface 22 of airfoil 20 can itself be the bottom of cell 10, therefore removing the need for a separate bottom element 50. The embodiment shown in FIG. 4 illustrates bottom element 50 as a flat plate whereupon the flat bottom surface 22 of airfoil 20 is fixed. Either with or without a separate element 50, the present cell 10 can incorporate a bottom surface having a camber airfoil bottom surface. That is, either the bottom surface 22 of airfoil 20 itself can be cambered, or bottom element 50 can incorporate such design.

Bottom element 50 preferably comprises an imperforate disc. Top element 40 can be an imperforate annular member defined between inner and outer edges 42, 44. However, it is possible to form openings in elements 40, 50 for the purpose of reducing their weight, provided only that such openings, when the cell 10 is rotated, do not significantly disrupt the intended action of the airfoil sections 21 or air flow over the rotary wing.

The fluid propulsion device 30 directs the airflow over the airfoil 20. Air movement over the airfoil 20 can be accomplish by means of airfoil segmentation, similar to a turbine with the dividers following certain curvature that is determined by the optimum rotational speed of operation, or by a "squirrel cage" blower type of unit with the vanes/baffles located at the perimeter of the cell or intake hole, or a combination of both. Preferably, the vanes extend around the perimeter of the cell 10.

Figure 6:
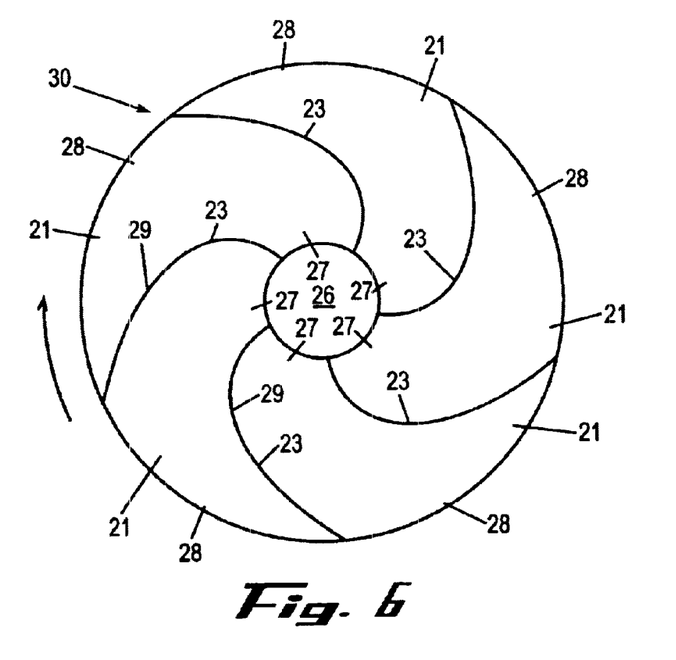
FIG. 6 is a top view of the airfoil of FIGS. 4 and 5 incorporating the vanes similar to turbocharger vanes.
Figure 8A:
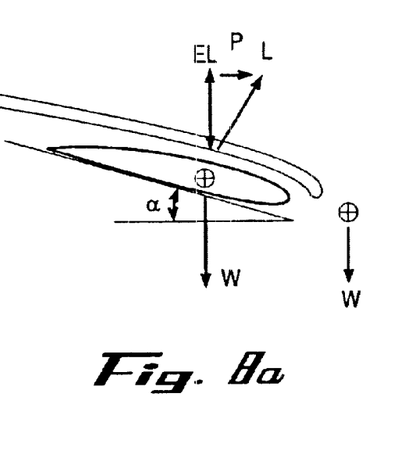
FIG. 8a illustrates the lift and propulsion components of an airfoil.
Figure 8B:
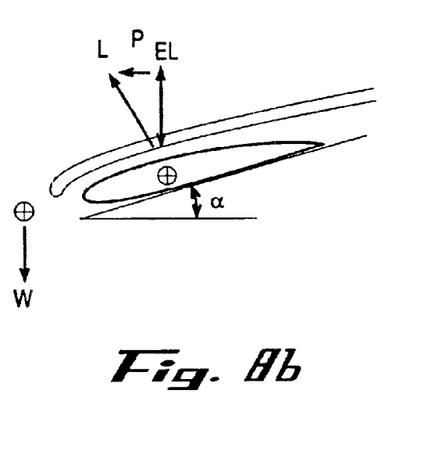
FIG. 8b illustrates another view of the lift and propulsion components of an airfoil.

FIG. 6 is a top view of the airfoil 20 with a fluid propulsion device 30 incorporating airfoil dividers 29 extending upward from grooves 23 in the airfoil. It will be understood that "upward" is a relative term used herein to describe the extension direction of the airfoil dividers 29 when the cell is viewed as shown in FIG. 6. If the cell were pitched off horizontal, or upside-down, the airfoil dividers 29 would not so extend "upward". For purposed of description, the dividers 29 will be described as extending perpendicularly from the airfoil 20 (in the up/down orientation shown in FIG. 6), and as extending parallel to the airfoil 20 (in the side-to-side orientation shown in FIG. 6; i.e. between a leading edge 27 and trailing edge 28 of the airfoil 20).

The circular airfoil 20 is segmented into airfoil sections 21 by several radially extending, spiral-shaped grooves 23. As shown, airfoil 20 incorporates five airfoil sections 21. The circular series of airfoil sections 21 are arranged such that they all face in the same direction about a circle. In particular, each of the airfoil sections 21 comprises a leading edge 27 and a trailing edge 28, such that the cell 10 according to the invention can rotate clockwise as viewed in FIG. 6. The dividers 29 need not extend fully between a leading edge 27 and trailing edge 28 of the airfoil 20, although FIG. 6 illustrates such fill side-to-side extension.

The airfoil sections 21 are arranged in a circular series, and are fixed atop a preferably rigid bottom element 50 or circular bottom plate member 50. The leading and trailing edges 27, 28 of each airfoil section 21 converge at the inner ring 54 and outer edge 52 of the bottom plate member 50, respectively.

Although the number of airfoil sections 21 is five in this embodiment, it will be appreciated that the number of airfoil sections 21 may be varied at will as a design consideration, from a minimum of two airfoil sections separated by a single groove 23 up to a maximum of any desired number.

Each airfoil section 21 is separated from one another by an airfoil divider 29 extending upward from each groove 23. Only the top edges of airfoil dividers 29 are visible in the top view illustration of FIG. 6. The airfoil divider is a wall separating each airfoil section 21. The airfoil sections 21 and dividers 29 are sandwiched between top and bottom elements 40, 50, respectively. Preferably, the dividers 29 are arcuately shaped corresponding to the curved shape of grooves 23, and extend into contact with the top element 40, thus creating segregated airfoil sections 21. The arcuate shape of dividers depends upon the direction of rotation of the cell 10. FIG. 6 illustrates a clockwise rotation. For a counterclockwise rotation, the arcuate shape of grooves 23 and dividers are reversed.

Of course, the FIG. 6 depiction of clockwise rotation is arbitrary, in the sense that a mirror image of the FIG. 6 structure can be made that rotates in the counterclockwise direction, which is equally as effective. Indeed, on aircraft, marine or submarine vessels where it is desired to position at least one of the cell devices 10 according to the invention on each side of the craft, it is useful to have the port devices rotating clockwise, and the starboard devices rotating counterclockwise, or vice versa, thereby to counteract torque developed by the individual devices.

FIGS. 2–5 depict fluid propulsion device 30 as a series of vanes of a baffling member. At least one baffling member 60 extends between the outer edges 42, 52 of the top and bottom elements 40, 50, or the inner edge 44 of the top element 40 and the inner ring 54 of the bottom element 50, or both. FIGS. 4 and 5 illustrate cell 10 having two baffling members 62, 64, one to the inside of the cell and one to the outside of the cell.

Segmentation of the airfoil 20 can be incorporated together with an outer "squirrel cage" 64 type of air propulsion device 30 as shown in FIG. 4. The position of the vanes on the outside perimeter is preferred because placing the baffle 62 in the inside creates excessive drag and turbulence as the air is "pushed" into the wing. On the other hand, as the air is "sucked" from the outside, it gives a smoother, more even, flow distribution over the wing. A combination of both baffles 62, 64 is possible as well.

Air is directed over the upper camber airfoil surface 24 of the airfoil 20 and/or each airfoil section 21 by means of the fluid propulsion device 30. Use of a baffling member 60 is similar to the blower in an air conditioning unit. When the propulsion device 30 is a combination of divider walls and vanes, the baffling member 60 forces the air to move over the airfoil surface 24 of the airfoil sections 21 because the baffling member 60 comprises individual angular vanes 66 that push the air as the cell 10 rotates. This air movement is also affected by the dividers and the arcuate shape of the dividers.

The air flow will be inclined to follow the contour of unit 10 and the airfoil 20, or the circular wing 10 can be positioned to have a positive angle of attack toward the airflow. This is similar to the wing of an airplane that has a dihedral angle for stability and varied angles of attack for lift generation. A prime mover speed or restriction of the air intake controls lift production by controlling the amount of air flow over the cell 10. A sectional cell can be used that will vary the angle of attack of the individual sections.

Figure 1:
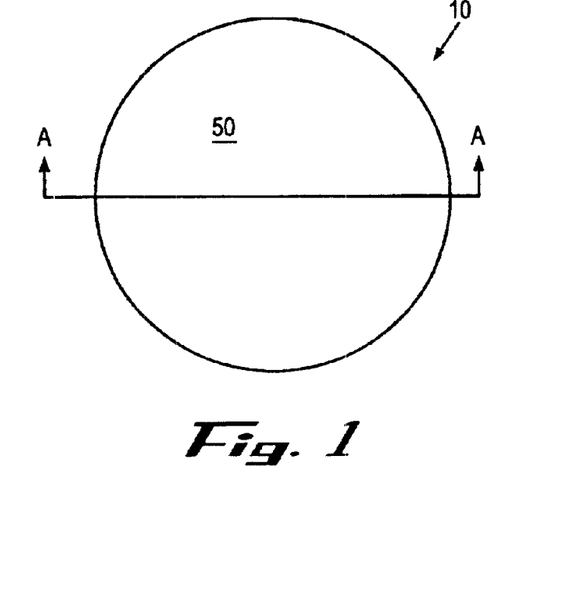
FIG. 1 is a bottom view of the present invention according to a preferred embodiment.
Figure 2:
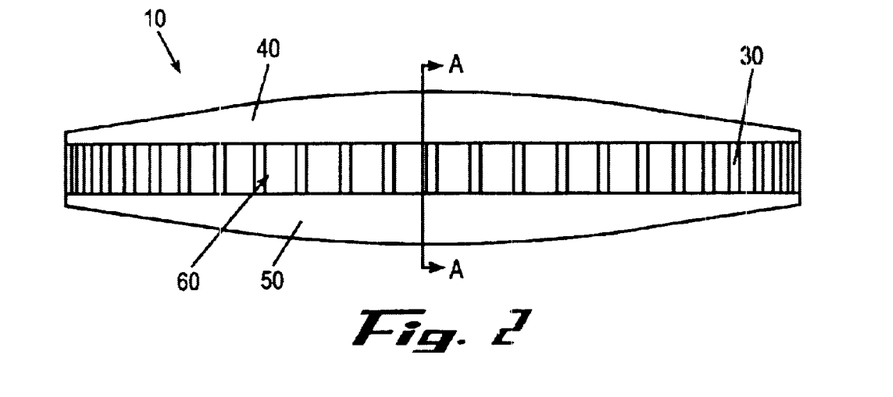
FIG. 2 is a side view of the invention of FIG. 1.
Figure 3:
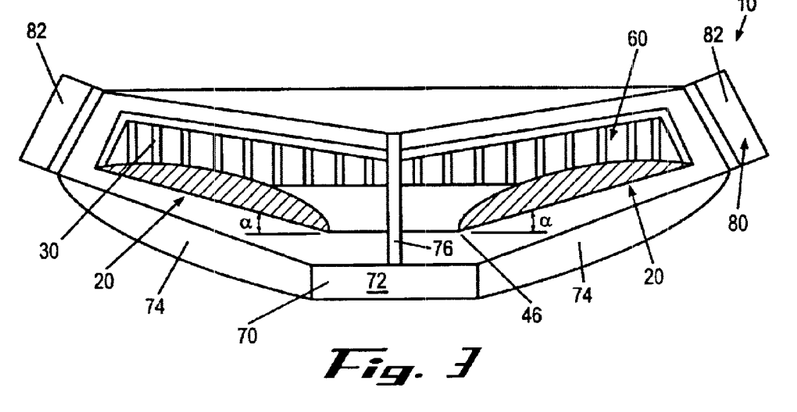
FIG. 3 is a side sectional view along plane A—A of FIG. 2.

The bottom plate member 50 can be connected to the motive source 70, for example, an output shaft 76 of a motor 72 confined within a motor housing 74, as illustrated in FIG. 3. The output shaft 76 extends generally upwardly from the housing 74. The motor shaft 76 may be driven directly by motor 72, or by suitable transmission gearing not shown. The output shaft 76 of the motor 72 preferably is coaxial with the center of the bottom plate 50 so as to rotate the circular series of airfoils 21 at a high speed in a predetermined direction of rotation.

Although FIG. 3 shows motor 72 disposed below bottom element 50, it will be appreciated that the motor 72 is not necessarily so disposed. Instead, it can be positioned above disc 40, provided its position does not disrupt the generation of lift radially outwardly of the airfoil sections 21. Likewise, by use of one or more universal joints, the motor 72 can be positioned to the side of the cell 10.

The lifting cell 10 can further comprise a steering assembly 80 (FIG. 1) that can tilt the cell 20 in any direction so that the effects shown in FIGS. 8a, 8b and 9a, 9b can be obtained. That is, to produce or generate the propulsion component that will allow a craft utilizing the cell 10 to move in any direction.

FIGS. 8a, 8b, 9a and 9b illustrate the principle of propulsion wherein as the lifting cell is tilted from the horizontal plane, the lifting force is broken into two components or vectors, a lifting component and a propulsion component. This propulsion component will produce a forward, backward, or sideways movement or a combination of them all in order to give the machine an omni-directional movement ability.

The inclination angle or dihedral angle will vary according to the degree of the desired or required stability and the ultimate or principal use of the craft where the cell 10 is incorporated. Too high an angle will disrupt the flying characteristic of the craft giving it too much stability. Too low, none at all, or negative angle will render the craft completely unstable or uncontrollable, and capable of going into progressive oscillations toward self destruction.

Thus described, the lift generated by the present airfoil is a result of the air velocity over cell which, in itself, is determined by the rotation speed of the rotor. It is also possible to keep the rotating speed of the rotor constant for optimum prime mover performance and restrict the air flow entering the system by means of a variable opening at the air intake into the cell.

With an air intake at the bottom of the cell, together with a disengagement mechanism, in the event of a prime mover failure, the machine will still produce certain amounts of lift as it gradually glides back to earth.

Figure 11:
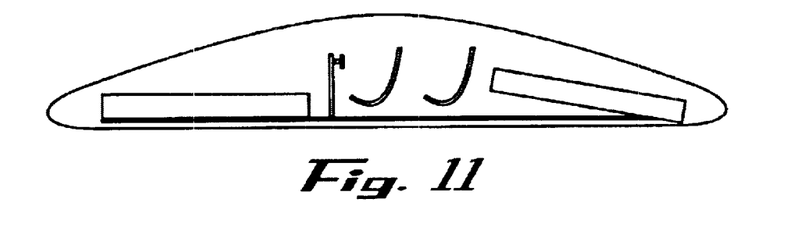
FIG. 11 is a side view of a flying machine utilizing two lifting cells in a tandem arrangement installed below the passenger compartment.
Figures 11, 17:
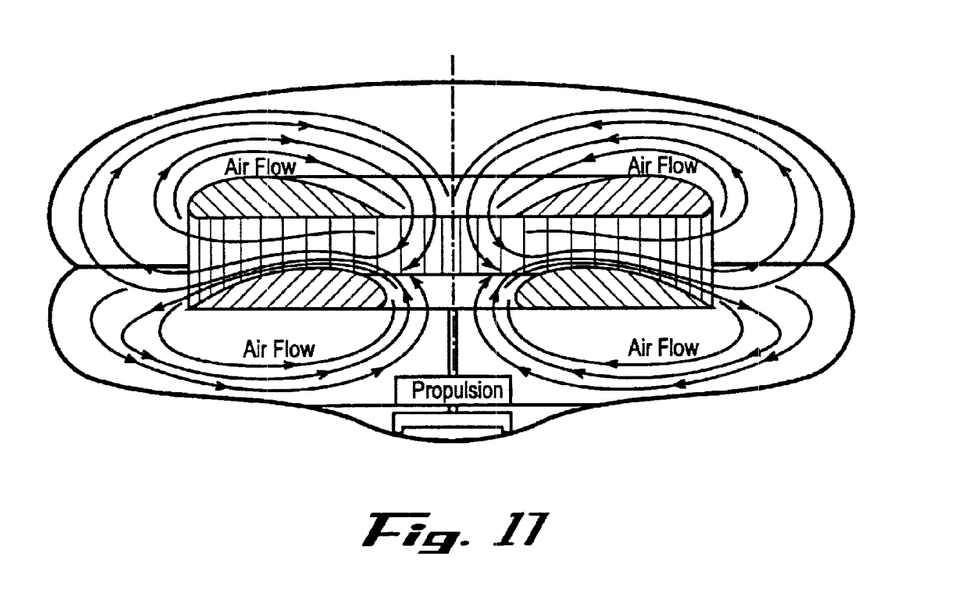
FIG. 17 is a cross-sectional view of a hermetic design embodiment of the present invention that operates with its own propulsion fluid in locations where there is no media or the media is detrimental to the equipment.

The present aeronautical cell 10 generally operates with a motive source 70 that can be an engine 72 in a housing 74. The engine 72 rotates the circular airfoil 20 attached to the fluid propulsion system 30 via shaft 76. As the cell 10 rotates, air is drawn into the center fluid intake hole 46 as shown in FIG. 4, past the fluid propulsion device 30, and over the airfoil 20. As air moves over airfoil 20, the air pressure over the airfoil drops creating an amount of lifting force proportional to the velocity of the air, the airfoil 20 area, and the coefficient of lift of the type of airfoil 20 used. The tendency of the engine housing 74 to rotate contrary to the rotation of the circular cell 10 is cancelled (neutralized) by the steering assembly 80, incorporating rudder-like sections 82 on multiple points around the perimeter of the cell 10 or by a torque counter-acting flywheel or inertial system as illustrated in FIG. 17. As each of the airfoil sections 21 is moved through the fluid, for example, air or water, the fluid suctions through the hole 46 defined by the inner edge 44 of the top plate member 40, and is then directed over the upper airfoil surfaces 24 by the baffling member 60. There is thus created a reduced pressure on the upper camber airfoil surface 24 of each airfoil section 21.

By mounting similarly shaped airfoil sections 21 to a rigid rotary bottom plate 50, a propulsion device 10 is created that generates a powerful lifting force tending to displace the propulsion device 10 upward. Within the cell 10 according to the invention, the lower pressure regions on the upper surfaces 24 of the airfoil sections 21 serve to generate a region of relatively lower pressure within the circular series of airfoil sections 21, such that the propulsion device 10, and any craft to which it is attached, tends to be lifted axially of the motor shaft 76, and normal to the outwardly exiting fluid. For example, the motor housing 74 can include an attachment assembly (not shown) by which the propulsion device 10 may be mounted to an aircraft, marine or submarine vessel.

It has been found that the airfoil sections 21 according to the invention provide much better propulsion characteristics if inclined than does a series of horizontally disposed airfoil sections 21. In use, the rotating cell 10 creates a force factor having both a lift component a propulsion component.

Accordingly, it will be appreciated that the airfoil sections 21 according to the invention should be neither horizontally nor vertically disposed, but rather should be inclined in an intermediate oblique position. In the embodiments described, the airfoil sections 21 are inclined at an optimum angle; however, it will be appreciated that this angle can be varied to vary the propulsion characteristics of the cell 10, as a matter of routine optimization. For example, it is contemplated that an inclination angle for the airfoil section 21 of about 3 or 4 degrees, or above, relative to the horizontal will produce desirable lift and propulsion characteristics.

A unit of the present invention can be manufactured completely enclosed and sealed carrying its own operating fluid such as air or other more appropriate type of fluid. This unit can operate on very rare atmospheres such as planet Mars and possibly even on places with no atmosphere at all. (FIG. 17).

Figure 10:
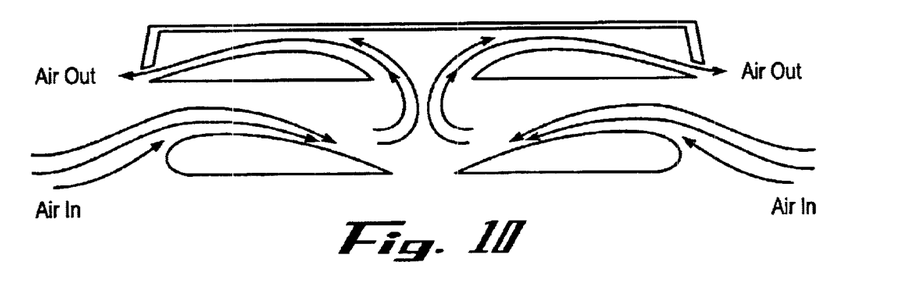
FIG. 10 illustrates stacked cells of the present invention.
Figure 16:
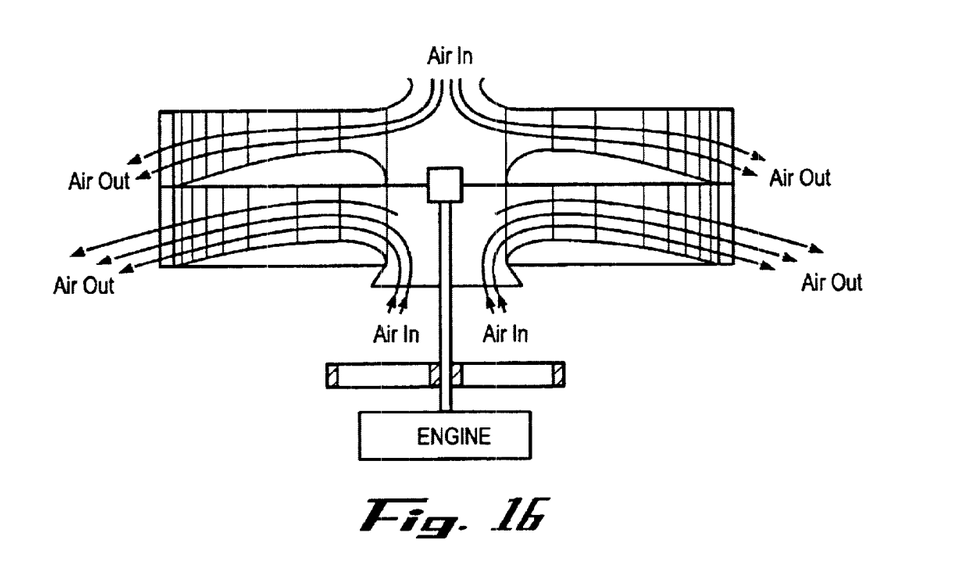
FIG. 16 is a side view of the connection of the motive source with the cell of the present invention illustrating two cells in series with individual air intakes, the bottom cell with a bottom intake and the top cell through the top.

FIG. 10 illustrates stacked cells of the present invention. This combination will produce a higher lifting capacity over just a single cell. In this combination, the two cells are working in series where air is expelled through the top cell after entering the bottom cell. A parallel combination is also possible as illustrated in FIG. 16 where the air is expelled at the outer edge of both cells after entering through the middle opening, top and bottom. In order to counteract torque, the cells can rotate in opposite directions utilizing a contra-rotating mechanism, similar to using an inertial torque-cancelling unit.

It will also be appreciated by those skilled in the art that the various structural components depicted in the figures may advantageously be formed from, for example, aluminum, carbon, fiber, plastics or other suitable aircraft-grade materials, or suitable materials for fabrication of marine or submarine vessels, and that the choice of materials will be dictated by the particular application of the propulsion device built according to the invention.

Figure 13:
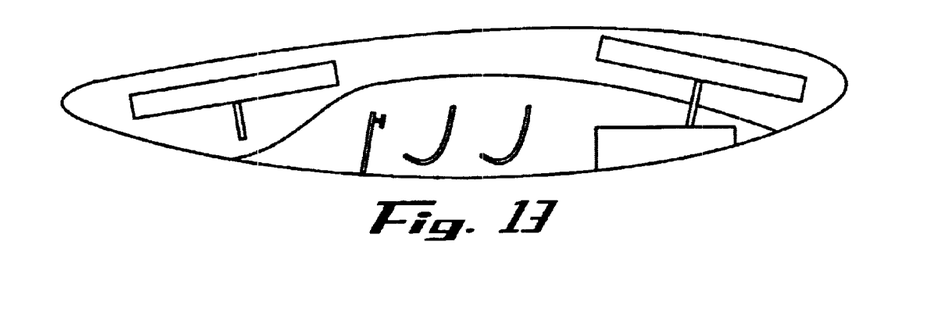
FIG. 13 is a side view of another flying machine utilizing the cells of the present invention with the cells installed above the passenger compartment.
Figure 14:
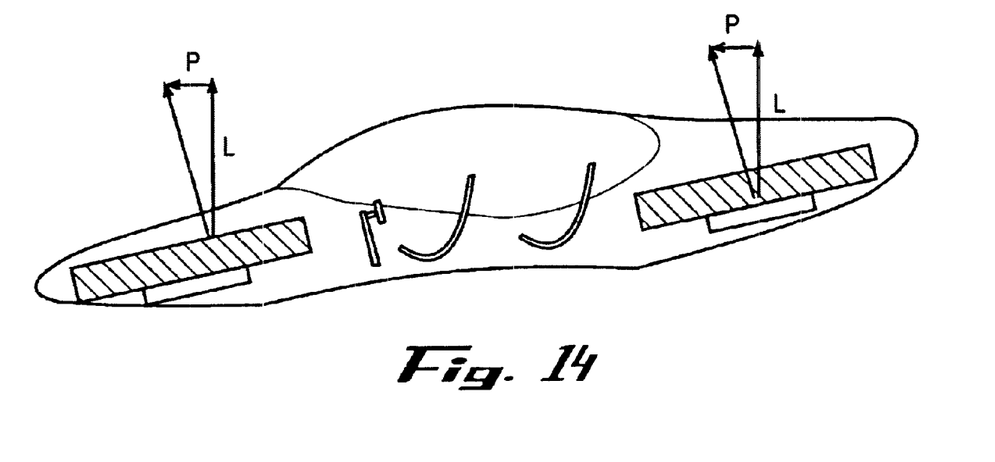
FIG. 14 is a side view of another flying machine utilizing the cells of the present invention on a forward tilted position indicating the lift (L) and propulsion (P) components.

As a self contained flying unit, the cell 10, cargo, passengers, and crew cabin can be incorporated between the engine 72 and the lifting cell 10. In yet another arrangement, two lifting cells 10 can be incorporated into a vehicle as illustrated in FIGS. 11–16. The multiple units 10 can run on one engine 72 or by two or more engines 72 as the lifting capacity mandates. FIG. 11 is a side view of a flying machine utilizing two lifting cells in a tandem arrangement; one in front and the other one in the rear. The cells can be operated by a single cell individually, engine with a propulsion means to the cells or by two engines operating each as illustrated in FIG. 14. A simple cell tilting mechanism, steering device 80, is shown controlling both cells from a single cockpit control.

Figure 12:
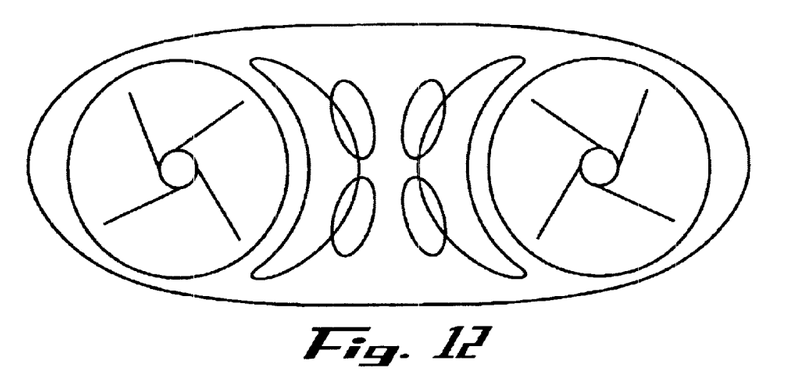
FIG. 12 is a top view of a flying machine as illustrated in FIG. 11.

FIG. 12 is a top view of a flying machine as illustrated in FIG. 11 with the lifting cells located on a plane below the occupants or operators. In FIG. 13, the lifting cells are located on a plane above the occupants or operators. This position of the lifting cells will give the operators a much better overall view.

Figure 15:
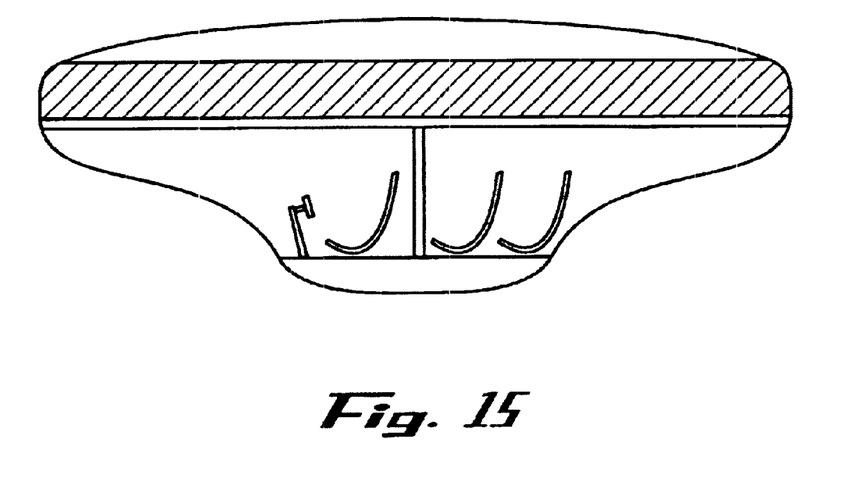
FIG. 15 is a side view of another flying machine utilizing the cells of the present invention with a single cell above the passenger compartment and the engine (or propulsion mechanism) at the bottom.

FIG. 15 illustrates a machine utilizing one single lifting cell at the top and a single engine or propulser at the bottom with the passengers compartment in the middle. Contra-rotating forces can be controlled utilizing a contra-rotating inertial disk or flywheel as shown in FIG. 17.

FIG. 16 is a side view of the connection of the motive source with the cell of the present invention.

Figure 9A:
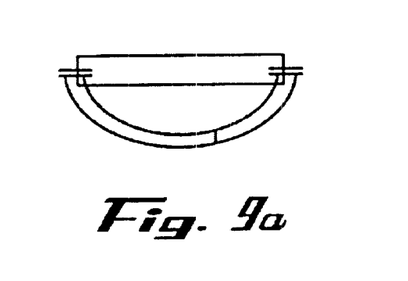
FIG. 9a illustrates the lift and propulsion components of an airfoil that is tilted off the horizontal.
Figure 9B:
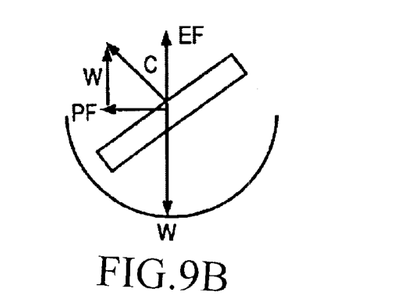
FIG. 9b illustrates the axis about which FIG. 9a lies, and the lift and propulsion components of an airfoil.

Tandem units can be completely independent as illustrated in FIG. 14 or they can be dependents as illustrated in FIGS. 9a and 9b.

The arrangement of FIG. 10 illustrates the air flowing through the first rotating wing and out through the second rotating wing. The airflow in these units will be created by one or by multiple blower-like units. In the second arrangement, as illustrated in FIG. 16, the airflow will be produced by two blower-like units.

While the invention has been disclosed in its preferred forms, it will be apparent to those skilled in the art that many modifications, additions, and deletions can be made therein without departing from the spirit and scope of the invention and its equivalents as set forth in the following claims.

What is claimed is:

1. A rotary aeronautical lifting cell for use in a fluid, the cell comprising:
   a. an airfoil having a bottom surface and an upper camber surface, the airfoil being an annular ring of an airfoil having a center fluid intake, the airfoil having an inner edge and an outer edge;
   b. a top element;
   c. a fluid propulsion system for propelling the fluid over the upper camber surface of the airfoil and below the top element; and
   d. a motive source to rotate the cell;
   wherein rotation of the cell forms a lower pressure above the upper camber surface than the pressure below the airfoil.

2. The lifting cell of claim 1, wherein the fluid propulsion system comprises at least two airfoil dividers extending perpendicularly from a portion of the upper camber surface of the airfoil to the top element, the airfoil dividers forming airfoil sections, the sections arranged in a circular series.

3. The lifting cell of claim 1, wherein the fluid propulsion system comprises a plurality of vanes located approximately around the inner edge or the airfoil, the vanes extending to the top element.

4. The lifting cell of claim 1, wherein the fluid propulsion system comprises a plurality of vanes located approximately around the outer edge of the airfoil, the vanes extending to the top element.

5. The lifting cell of claim 1, wherein the top element incorporates a dihedral angle capable of providing stability to the lifting cell.

6. The lifting cell of claim 1, wherein the top element is imperforate.

* * * * *